United States Patent [19]
Taira et al.

[11] 3,921,444
[45] Nov. 25, 1975

[54] FREQUENCY METER FOR VEHICLE RUNNING SPEED VERSUS FUEL CONSUMPTION RATE

[75] Inventors: Mitsuru Taira, Toyota; Giichiro Ono, Tokyo, both of Japan

[73] Assignee: Toyota Jidosha Kogyo Kabushiki Kaisha, Japan

[22] Filed: Oct. 18, 1974

[21] Appl. No.: 515,890

[30] Foreign Application Priority Data
Oct. 30, 1974 Japan.................. 49-48438

[52] U.S. Cl.............................. 73/114; 235/150.21
[51] Int. Cl.²............................................ G01F 9/00
[58] Field of Search.......... 73/114, 116; 235/150.21

[56] References Cited
UNITED STATES PATENTS

| | | | |
|---|---|---|---|
| 2,663,186 | 12/1953 | Nieburg | 73/114 |
| 3,347,092 | 10/1967 | Statson | 73/114 |
| 3,745,817 | 7/1973 | Williams et al. | 73/119 A |

*Primary Examiner*—Jerry W. Myracle
*Attorney, Agent, or Firm*—Stewart and Kolasch, Ltd.

[57] ABSTRACT

A frequency meter for vehicle running speed versus fuel consumption rate adapted to calculate an instant value of fuel consumption rate at a predetermined time interval and to drive a particular counter in a counter matrix arranged in a co-ordinate of vehicle running speed and fuel consumption rate, said particular counter corresponding to a point in the co-ordinate corresponding to particular vehicle running speed and fuel consumption rate at a given moment. The frequency matrix thus obtained can favourably be used to draw frequency contour lines regarding occurance of various combinations of vehicle running speeds versus fuel consumption rates.

5 Claims, 3 Drawing Figures

FREQUENCY CONTOUR LINES OF VEHICLE RUNNING SPEED VERSUS FUEL CONSUMPTION RATE

FREQUENCY METER FOR VEHICLE RUNNING SPEED VERSUS FUEL CONSUMPTION RATE

BACKGROUND OF THE INVENTION

1. Field of the Invention:

This invention relates generally to a device for testing the performance of a vehicle equipped with an internal combustion engine, such as an automobile and, more particularly, a frequency meter for vehicle running speed versus fuel consumption rate which permits instantaneous and synthetic estimation of the relation between vehicle speed and fuel consumption rate.

2. Description of the Prior Art:

The fuel consumption rate is conventionally estimated as a mean value for an amount of running distance covered by various kinds of running conditions which are encountered in normal driving or, in some instances, a mean value for a predetermined running distance covered by a predetermined constant driving condition. These mean values of the fuel consumption rate are, of course, useful as an indication of the economic standard of the vehicle fuel consumption but are useless as a basis for judging the performance of the engine efficiency, driving performance of the chasis, etc, at a given moment during operation of the vehicle.

SUMMARY OF THE INVENTION

The object of this invention is to obtain material with which to judge the synthetic performance of a vehicle by measuring the vehicle speed and the corresponding instantaneous fuel consumption rate during each relatively short sampling time, e.g. 1, 5, 10 or 15 second, thereby to obtain the frequency of occurance of various combinations of vehicle running speeds versus fuel consumption rates, the frequency thus obtained being drawn as frequency contour lines to provide the aforementioned material.

According to this invention, the aforementioned object is accomplished by a frequency meter for vehicle running speed versus fuel consumption rate comprising a speed meter, a fuel flow meter, means to calculate an instant value of the fuel consumption rate from the ratio of the vehicle running speed measured by said speed meter and the fuel flow rate measured by said fuel flow meter, means to designate a region out of a first group of a plurality of predetermined steppedly arranged regions according to said instant value of the fuel consumption rate, said designated region being the one to which said instant value belongs, means to designate a region out of a second group of a plurality of predetermined steppedly arranged regions according to said speed measured by said speed meter, said designated region being the one to which said speed belongs, a counter matrix composed of counters corresponding to a matrix constituted by said first and second groups of regions, and means to actuate a particular counter for each predetermined time, said particular counter being the one located at the crossing point of a set of regions which are at any given moment designated in said first and second groups.

By employing the frequency meter for vehicle running speed versus fuel consumption rate as mentioned above, the frequencies of occurance of respective combinations of vehicle running speed versus fuel consumption rate are obtained by the indications of the respective counters. The frequencies thus obtained will be readily expressed as frequency contour lines by, for example, taking the vehicle running speed along X-axis and the fuel consumption rate along Y-axis.

According to a particular feature of this invention, the speed meter and the fuel flow meter may conveniently be of an analogue type, the analogue values obtained by said meters being processed by an analogue computer to produce said instant value of the fuel consumption rate as an analogue value which is then converted into a digital value by an A/D converter, said digital value being applied to a diode matrix to make a designation in said first group of regions.

According to another particular feature of this invention, the analogue value obtained by the analogue speed meter may preferably be converted into a frequency signal by a V/F converter, said frequency signal being further processed by a timing means and a gate means to produce a digital value which is applied to a shift register to make a designation in said second group of regions. In this case, said timing means may also serve as a timing means to actuate the counter matrix at a predetermined time interval.

However, according to another feature of this invention, the speed meter and the fuel flow meter may be of a digital type, whereby all operations including the calculation of said instant value of the fuel consumption rate, the designation of the regions in said first and second groups and the actuation of said counter matrix can be performed by a digital computer.

BRIEF DESCRIPTION OF THE DRAWING

In the accompanying drawing.

DESCRIPTION OF THE PREFERRED EMBODIMENT

In the following this invention will be described in more detail of a preferred embodiment with reference to the accompanying drawing.

Figure 1:
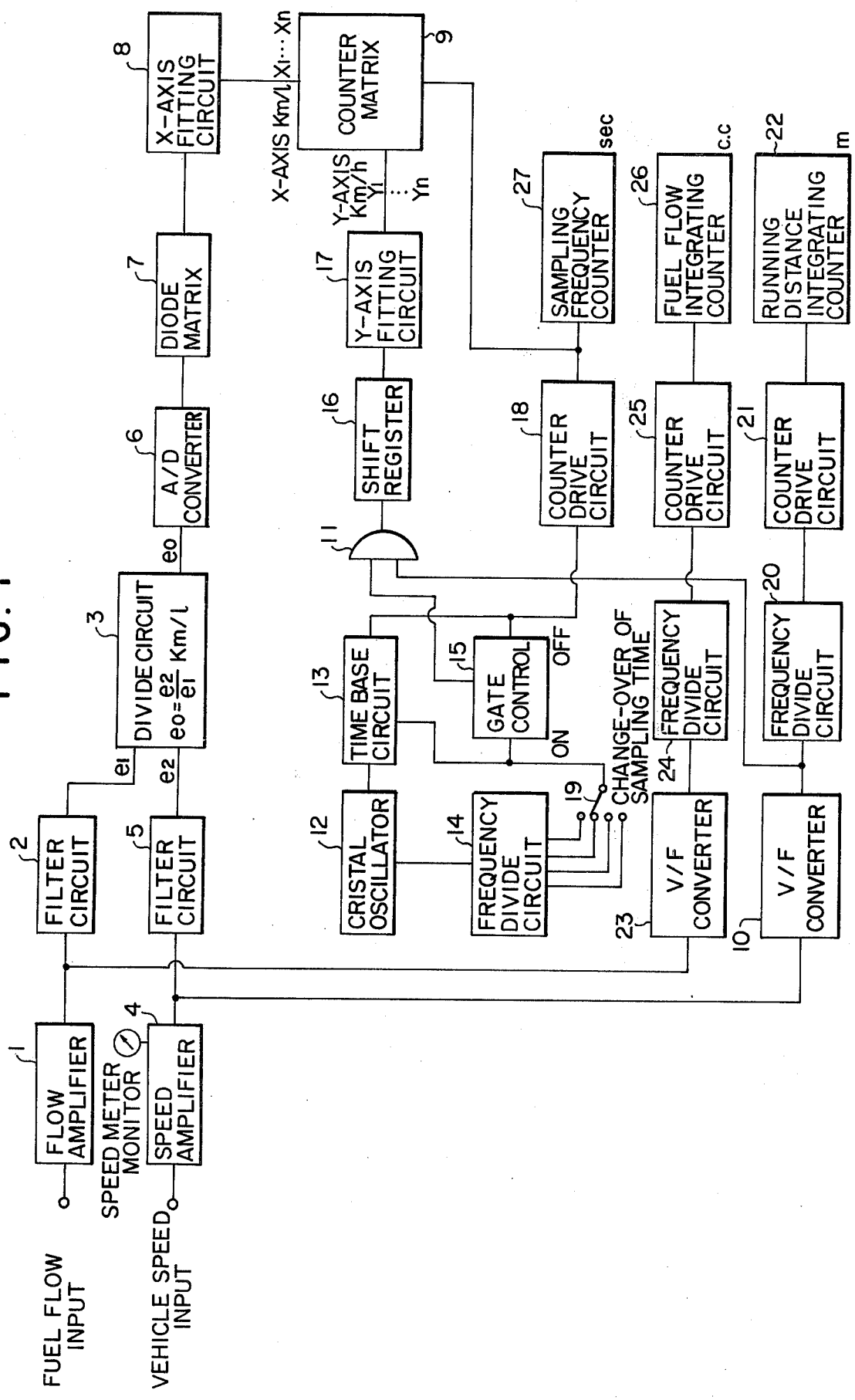
FIG. 1 is a block diagram showing the constitution of an embodiment of the frequency meter for vehicle running speed versus fuel consumption rate according to this invention; and, FIG. 2 are graphs showing examples of the frequency contour lines regarding vehicle running speed versus fuel consumption rate.

Referring to FIG. 1, an input obtained from a fuel flow meter of an analogue type is amplified in a flow amplifier 1 and is passed through a filter circuit 2 to be introduced into a divide circuit 3. On the other hand, the vehicle speed measured by a speed meter of an analogue type is amplified by a speed amplifier 4 and is passed through a filter circuit 5 to be fed into the divide circuit 3. In the divide circuit 3, division is performed between the fuel flow e1 and the vehicle speed e2 and the fuel consumption rate e0 is obtained. This analogue value of the fuel consumption rate is converted into a digital value in an A/D converter circuit 6 and the digital value thus obtained designates a region out of a first group of a plurality of steppedly arranged regions predetermined by a diode matrix 7, and then a designation of a corresponding region out of a plurality of regions arranged along X-(or Y-) axis of a counter matrix 9 is made by a X-(or Y-) axis fitting circuit 8.

On the other hand, the analogue value of the vehicle speed is led from the speed amplifier 4 to be converted into a frequency signal by a V/F converter 10, the frequency signal thus obtained being fed into a gate 11. The gate 11 is supplied with a control signal at a predetermined time interval from a timing means composed of a crystal oscillator 12, time base circuit 13 and frequency divider circuit 14 by way of a gate control circuit 15. Therefore, a digital value of the vehicle speed is obtained through the gate 11 at a predetermined time interval, this digital value being introduced into a shift register 16 to make a designation out of a second group of a plurality of predetermined steppedly arranged regions regarding the vehicle speed. According to this designation, in the second group of regions, a Y-(or X-) axis fitting circuit 17 is operated to make a corresponding designation along Y-(or X-) axis of the counter matrix 9. The counter matrix 9 is supplied with a counter drive signal from the gate control circuit by way of a counter drive circuit 18 so as to actuate a particular counter for a predetermined time, said particular counter being the one located at the crossing point of a set of regions which are at any given moment designated in the group of regions regarding the fuel consumption rate arranged along the X-axis and the group of regions regarding the vehicle speed arranged along the Y-axis. Thus, respective counters record the frequencies of occurance of respective combinations of vehicle running speed versus fuel consumption rate. Reference number 19 designates a change over switch for the sampling time, with which one of several predetermined sampling times can be selected. The sampling time may preferably be, for example, 1, 5, 10, 15 sec, etc. The vehicle speed converted into a frequency signal by the V/F converter 10 is passed through a frequency divider circuit 20 and a counter drive circuit 21 to be fed into a running distance intergrating counter 22 to drive the same to indicate the overall running distance of the vehicle. The analogue value regarding the fuel flow obtained from the flow amplifier 1 is tapped out to be fed into a V/F converter 23, wherein the analogue value of the fuel flow is converted into a frequency signal which is then passed through a frequency divider circuit 24 and a counter drive circuit 25 to be fed into a fuel flow intergrating counter 26 to drive the same to indicate the total fuel flow. Furthermore, a sampling frequency counter 27 is driven by the gate control circuit 15 by way of the counter drive circuit 18 to indicate the sampling frequency.

Figure 2A:
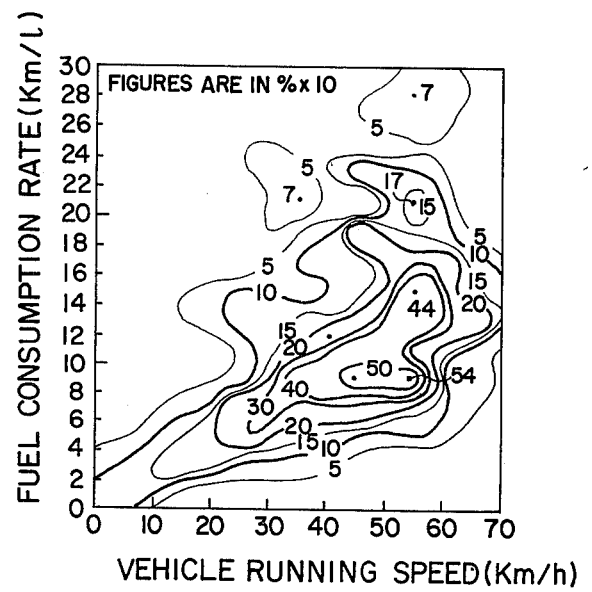
Figure 2B:
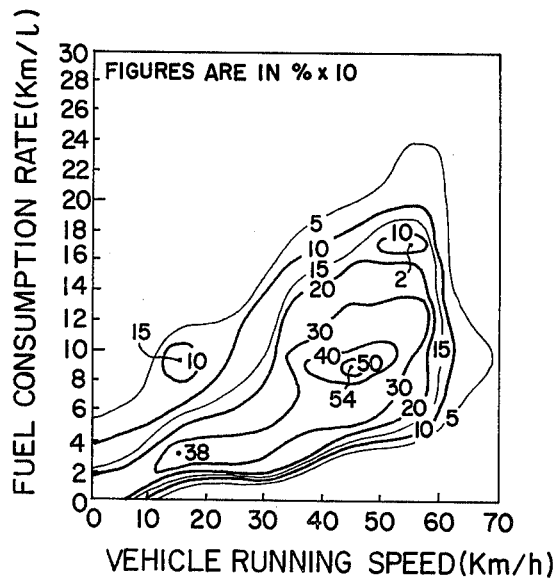

FIG. 2 shows examples of the frequency contour lines drawn regarding vehicle running speed versus fuel consumption rate employing the frequency meter for vehicle running speed versus fuel consumption rate having the constitution shown in FIG. 1. In the case of a vehicle shown in FIG. 2-A, it will be appreciated that it shows a relatively high fuel consumption rate over a relatively wide range of running speeds normally employed and therefore has a favourable performance. In contrast thereto, in the case of a vehicle shown in FIG. 2-B, it will be noted that the fuel consumption rate rapidly lowers as the vehicle running speed lowers and therefore its performance is relatively inferior. From various comparative investigations of these frequency contour lines of vehicle running speed versus fuel consumption rate, the performances of various kinds of vehicles can be comparatively investigated and suggestions for improvements will be obtained.

We claim:

1. A frequency meter for vehicle running speed versus fuel consumption rate comprising a speed meter, a fuel flow meter, means to calculate an instant value of the fuel consumption rate from the ratio of the vehicle running speed measured by said speed meter and the fuel flow rate measured by said fuel flow meter, means to designate a region out of a first group of a plurality of predetermined steppedly arranged regions according to said instant value of the fuel consumption rate, said designated region being the one to which said instant value belongs, means to designate a region out of a second group of a plurality of predetermined steppedly arranged regions according to said speed measured by said speed meter, said designated region being the one to which said speed belongs, a counter matrix composed of counters corresponding to a matrix constituted by said first and second groups of regions and means to actuate a particular counter for each predetermined time, said particular counter being the one located at the crossing point of a set of regions which are at said instant designated in said first and second groups.

2. A frequency meter according to claim 1, wherein the speed meter and the fuel flow meter are of an analogue type, the analogue values obtained by said meters being processed by an analogue computer to produce said instant value of the fuel consumption rate as an analogue value which is then converted into a digital value by an A/D converter, said digital value being applied to a diode matrix to make a designation in said first group of regions.

3. A frequency meter according to claim 1, wherein the speed meter is of an analogue type, the analogye value obtained by said speed meter being converted into a frequency signal by a V/F converter, said frequency signal being processed by a timing means and a gate means to produce a digital value, which is applied to a shift register to make a designation in said second group of regions.

4. A frequency meter according to claim 3, wherein said timing means also serves as a timing means to actuate the counter matrix at a predetermined time interval.

5. A frequency meter according to claim 1, wherein the speed meter and the fuel flow meter are of a digital type, and all operations including the calculation of said instant value of the fuel consumption rate, the designation of the regions in said first and second groups and the actuation of said counter matrix are performed by a digital computer.

* * * * *